Feb. 24, 1942.    H. J. SCHELHAMMER ET AL    2,274,260
METHOD OF PRODUCING PERMEABLE BODIES
Filed June 6, 1939
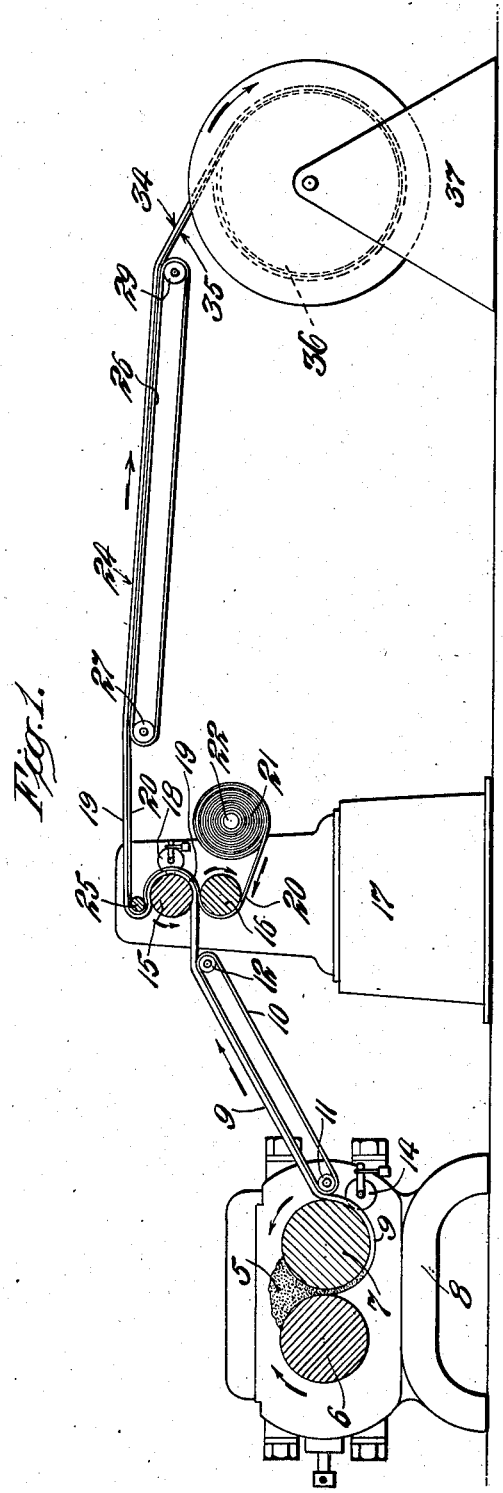
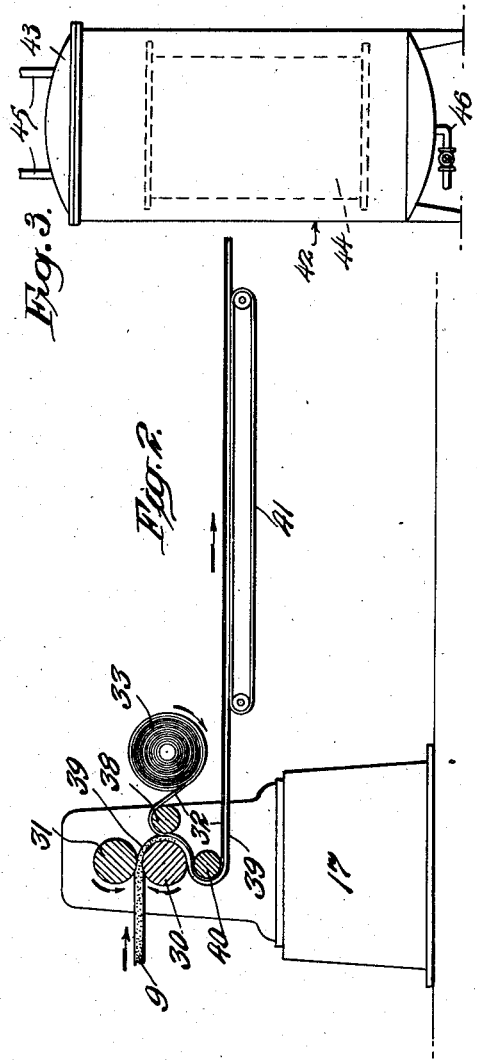
INVENTORS
HERMAN J. SCHELHAMMER
DONALD H. COURSEN
BY
English, Studwell
ATTORNEYS Patented Feb. 24, 1942

2,274,260

UNITED STATES PATENT OFFICE 2,274,260

METHOD OF PRODUCING PERMEABLE BODIES

Herman J. Schelhammer, Whitestone, N. Y., and Donald H. Coursen, Butler, N. J., assignors to American Hard Rubber Company, New York, N. Y., a corporation of New York Application June 6, 1939, Serial No. 277,586

7 Claims. (Cl. 18—53)

The invention relates to an improvement in methods of producing permeable hard rubber bodies in sheet or plate form suitable for use as separators in electrolytic primary or secondary cells, as filter media, as diaphragms for osmosis and diffusion, and for various other purposes chemical and physical.

In the manufacture of hard rubber in the form of permeable or microporous sheets or plates for use as separators in electrolytic cells or for other purposes, considerable difficulty has been experienced in producing the sheets or plates in flat, unwarped condition, and in uniform sizes. In the usual commercial practice the uncured permeable hard rubber composition or compound is extruded in sheet or strip form from a pair of calender rolls with or without flutings or grooves on either or both sides. The sheets or strips of rubber composition are then introduced into a vulcanizer and "wet" vulcanized, that is to say, subjected to a bath of hot water or live steam. Immediately the sheets or strips of uncured permeable hard rubber composition leave the calender rolls they tend to change the shape impressed on them by the profile of the calender rolls. They are also wet or moist and relatively soft, and being thin are easily broken and in readily distortable condition. The first problem then is to keep the freshly-formed uncured sheets or strips of permeable rubber composition from breakage and distortion and deliver them in a flat, smooth condition to the vulcanizer. This may be partly accomplished and at the expense of considerable effort, by delivering the strips of rubber composition from the calender rolls on to flat slabs, smoothing them out thereon and in that condition introducing them into the vulcanizer. Even this method does not always prevent shrinkage due to evaporation before the strip of rubber composition reaches the vulcanizer.

The nature and relationship of the particles constituting the ingredients of the usual type of permeable hard rubber composition or compound is such that even if the strip of permeable rubber composition is placed in the vulcanizing chamber in flat, smooth, unshrunk condition, the process of vulcanization frequently causes it to distort and warp, and particularly to contract lengthwise and expand transversely, thereby rendering the separator strip entirely useless or requiring cutting and grinding of the individual separators or plates before they are suitable for use for their intended purposes. This action in the strip of permeable hard rubber composition during vulcanization is thought to be largely due to the fact that the material is porous and saturated with water both before and during vulcanization, which differentiates the vulcanization of a permeable hard rubber composition from a non-porous hard rubber composition which is not saturated with water during vulcanization.

One object of the present invention is to provide a method of more expeditiously handling the strip of uncured permeable hard rubber composition from the moment of its extrusion from the calender rolls to its introduction into the vulcanizer, while at the same time more efficiently keeping the strip smooth and flat and preventing it from shrinking, distorting or breaking. Another object of the invention is to provide a method and means of preventing the strip of permeable hard rubber composition from distorting, warping, expanding or contracting during the wet vulcanization process.

Although the method of the invention is applicable to the production of a sheet of the permeable hard rubber in any desired width, it will be described for the sake of simplicity of description in connection with the production of separator or filter plates which are usually about six inches wide. The material extruded from the calender rolls is known as a strip, whatever its length, and will be so termed in the following description, it being understood that this term includes any width of material extruded from the calender rolls. The strip of uncured permeable hard rubber composition as it comes from the calender rolls is ready for immediate vulcanization. The problem, as indicated above, is to get the strip of rubber into the vulcanizer in smooth, flat, undistortable condition and keep it in that condition during vulcanization. This is accomplished according to the principle of the present invention by bringing the strip of permeable hard rubber composition into adhering contact with a substantially unstretchable material, such as strong paper, stiff fabric or fine wire netting. If paper is employed as the supporting medium for the strip of uncured rubber composition, it is preferred to use a "parchment" type of paper, that is to say, an unstretchable paper strong enough when the strip of rubber composition is in adherence therewith to prevent the strip of rubber from moving longitudinally and transversely relatively to the paper, both before and during vulcanization. It will be understood that the term "paper of parchment type" as herein used includes any strong paper suitable for the described purpose. Paper of the general type known in the trade as "kraft" has been found satisfactory for the present purpose.

The bringing of the calendered strip of uncured permeable hard rubber composition and the strip of paper into adhering relatively non-movable contact with each other may be effected at any point before or after extrusion of the strip of rubber and in various ways, the only requirement being that the temporary adherence between the strip of rubber and the strip of paper be firm enough to prevent the two strips from moving relatively to each other, or rather, strong enough to prevent the strip of rubber from moving relatively to the strip of paper, as by its tendency to contract longitudinally, expand laterally, and warp or distort, both before and during vulcanization. A satisfactory method for the purpose of efficiency and expedition of manufacture is to bring the strip of paper or other unstretchable supporting strip into contact with the strip of rubber as the latter is passing through or between the calender rolls. Other satisfactory methods of bringing the rubber and paper strips together may be employed, as hereinafter described.

The strip of calendered, uncured permeable hard rubber composition and the strip of paper or other supporting material having been brought into contact so as to be non-movable relatively to each other, the strip of rubber is in condition for vulcanization. The continuous strip of superposed rubber and paper emerging from the calender rolls may be festooned on suitable supports and in that condition placed in the vulcanizer. Another satisfactory method is to cut the strips of rubber and supporting paper into convenient lengths, say, five or six feet, and stack them one on top of the other in smooth, flat condition and introduce the stack or pile of alternating rubber and paper strips into the vulcanizer for wet vulcanization of the rubber strips. Another satisfactory method is to cut the strip of rubber and supporting paper strip into requisite separator or filter plate lengths and hang them in vertical position in the vulcanizer. Another method and one which commends itself because the results are highly satisfactory with respect to the finished product and also because of the saving of time and expense in manufacture is to wind the strip of superposed rubber and paper as it emerges from the calender rolls into a roll of convenient size for handling and then introduce the roll into the vulcanizer in which the rolled strip of rubber composition is subjected to wet vulcanization. On the completion of the vulcanizing step the roll consisting of the coiled strip of vulcanized rubber and the coiled strip of paper which still adheres to one side of the strip of rubber, is readily unwound and the rubber and paper brought into straight, flat condition, after which they are passed through a drier to remove the excess or surplus moisture from the strip of rubber. During the drying of the vulcanized strip of rubber the strip of paper becomes separated therefrom.

In the accompanying diagrammatic drawing are illustrated the steps of preparing the strip of uncured permeable hard rubber composition and applying a strip of paper or other unstretchable supporting material thereto, so as to keep the strip of rubber in flat unwarped condition for introduction into the vulcanizer. Fig. 1 is a side elevation, partly in section, of suitable apparatus for accomplishing these steps; Fig. 2 is a side elevation, partly in section, illustrating the application of the supporting strip to the strip of rubber beyond the bite of the calender rolls, that is, beyond the point where the latter passes between calender rolls; and Fig. 3 is a diagrammatic view, in side elevation, of a vertical vulcanizer.

The ingredients composing the hard rubber compound for producing permeable or microporous hard rubber in sheet or plate form may be any preferred mixture, there being several described in the published art. A satisfactory separator or filter plate may be produced from the mixture described in the patent to Hunt, 2,120,281 dated June 14, 1938, which is as follows:

|  | Pounds |
|---|---|
| Smoked sheet | 100 |
| Sulphur | 50 |
| Stearic acid | 5 |
| Porous rubber dust | 24 |
| Silica gel (dry, porous) | 226 |

These ingredients having been properly mixed with water, as described in said patent, or otherwise, are formed into the mass, indicated at 5, resting on the rolls 6 and 7 of a warming mill 8, which delivers a preliminary strip 9 of the uncured permeable hard rubber composition onto the conveyor belt 10 which passes over the rolls 11 and 12. As the preliminary strip 9 is delivered from the roll 7 it is trimmed to proper width by cutters 14 (only one of which is shown). The preliminary strip 9 of porous rubber composition is thicker than the finished sheet or plate, and from the conveyor belt 10 it is delivered to the rolls 15 and 16 of a calender 17 of usual construction and operation. The calender rolls are spaced apart the necessary distance to reduce the preliminary strip of porous rubber composition 9 to the overall thickness desired in the finished article, usually about .08 inch. It is assumed that the type of separator or filter plate desired is flat or plane on one side and fluted or grooved on the other, and accordingly, the lower calender roll 16 will be smooth whereas the upper or profile roll 15 will be grooved circumferentially to produce the desired ribs on the upper surface of the strip of rubber composition. Since the preliminary strip 9 of rubber composition is squeezed to reduce the strip to the desired thickness it expands laterally and cutters 18 are provided to trim the strip 19 of rubber composition emerging from the calender rolls to the requisite width, usually about six inches.

As the preliminary strip 9 of rubber composition passes between the calender rolls, a strip of paper 20 or equivalent material is applied to the underside of the rubber strip, and for this purpose the strip of paper is fed over the lower calender roll 16 from a roll of paper 21, mounted on shaft 22 arranged parallelly with the calender rolls, the roll of paper 21 being in alinement with the strip of rubber passing over the upper calender roll 15. It will be borne in mind that as the strip of rubber composition emerges from the calender rolls it is still moist and somewhat tacky, and that the surface of the strip of paper, even strong paper of parchment type, is slightly porous or absorbent, and that consequently, by bringing the strip of rubber composition and strip of paper tightly into contact with each other by means of the calender rolls, they are brought into a temporary firm adherence with each other which will persist through the steps of the further treatment to which the strip of rubber composition is subjected and until the finished strip is produced. This adherence of the strip of moist rubber composition to the supporting strip of paper is so strong that the strip of moist rubber composition is unable to move relatively to the strip of paper while the two are in contact, until after the strip of rubber composition is vulcanized and is passed through the drier, whereby there results the production of a strip of vulcanized permeable hard rubber which is of substantially the same width and thickness as the strip of uncured permeable rubber composition delivered from the calender rolls.

Although we have described the strip of uncured calendered hard rubber composition as having been brought into temporary, relatively immovable coherence with a strip of paper before vulcanization, it will be understood that the invention is not to be restricted to the use of paper as the unstretchable material, because other unstretchable materials have given satisfactory results, for example, a stiff, substantially unstretchable fabric, such as fine linen or the like. We prefer, however, to use a strong paper of the parchment type as the supporting strip for the strip of uncured porous hard rubber compound for several reasons. In the first place, it is strong enough to stand the strain of passing through the calender rolls and over the conveyor pulleys without distortion, and it is sufficiently unstretchable to prevent the sheet of uncured hard rubber compound from stretching, contracting or warping while in contact therewith. In the next place, the use of paper is preferred because thus far it is the cheapest material available. The reaction effects during vulcanization tend to destroy the fibers both of paper and of fabrics, so that when even the best grades of textile fabrics are used as the supporting media they have a relatively short period of usefulness and must be replaced. Paper, on the other hand, is relatively so cheap that it can be used only once and then scrapped.

The superposed strips of hard rubber composition and paper pass from the upper calender roll around an idler roll 25 and thence onto the conveyor belt 26 which passes around the rolls 27 and 29. The strip of uncured permeable hard rubber composition being at this stage of the improved method of production in a moist, easily pliable condition the passage of the strip of rubber around the relatively small idler roll 25 does not disrupt it or cause any strains to occur in it, especially since it is supported and held by the strip of paper 20. The superposed strips of rubber composition and supporting paper are now in condition for introduction into the vulcanizer, in convenient lengths in the straight, flat condition indicated at 24. It has been found expedient, however, in the commercial practice of the improved method to wind the superposed strips of rubber composition and paper into roll form and in that form introduce them into the vulcanizer. For this purpose the strip consisting of the superposed layers of rubber composition 34 and paper 35 as they pass from the conveyor belt 26 are wound up together into the roll 36 mounted on the support 37.

In Fig. 2 is illustrated the step of applying the supporting strip of paper or other unstretchable material to the flat side of the strip of rubber composition at a point beyond its emergence from between the profile rolls. In this figure the rib and groove-forming roll is indicated at 30 and the flat roll at 31. The strip of paper 32 from the roll 33 is fed over an idler roll 38 mounted parallelly with the calender roll 30 and spaced apart therefrom the thickness of the calendered strip 39 of rubber composition and the thickness of the strip of paper 32 so that the strip of rubber composition and the strip of paper will be brought into firm, non-movable adherence with each other. The strip consisting of the superposed strips of rubber 39 and paper 32 passes over a roll 40 onto a conveyor belt 41 and thence is wound into a roll for introduction into the vulcanizer.

When the roll 36 consisting of the successive, superposed layers of paper and rubber composition has reached a diameter convenient for handling, the strip of superposed layers of paper and rubber composition is cut transversely and the free ends of the two layers are held against the roll in any convenient manner, as by tying them thereto with a binding cord. The roll is then placed in the vulcanizer in which it is subjected to wet vulcanization in either hot water or live steam.

The vulcanizer, which may be of conventional vertical type, is illustrated diagrammatically at 42 in Fig. 3. The cover 43 of the vulcanizer 42 having been removed, a number of rolls of uncured rubber composition and paper are placed in the vulcanizing chamber 44, the cover replaced, and then steam or hot water admitted to the interior of the vulcanizer through one of the pipes 45, for effecting the curing or vulcanization of the hard rubber composition in the usual manner. The waste water or condensate is withdrawn from the vulcanizer through the valve pipe 46.

When the thorough vulcanization of the coil of rubber composition has been effected, the roll is removed from the vulcanizer while in a warm, unset condition, and the roll unwound. The unwinding of the roll brings the strip of vulcanized hard rubber into straight, flat form in which condition it is dried to remove the excess or surplus water therefrom, and during the drying process the strip of paper separates itself from the dried under surface of the strip of vulcanized rubber. The strip of rubber may now be cut into lengths suitable for the purpose in view.

Having thus described the invention, what we claim as new is:

1. The method of producing a strip of undistorted vulcanized permeable hard rubber composition which consists in preparing a preliminary strip of uncured permeable hard rubber composition, passing the preliminary strip of rubber composition and a strip of unglazed unstretchable paper in direct contact with the strip of rubber composition through calender rolls whereby the strip of rubber composition and the strip of paper are attached so tightly together as to be substantially relatively unmovable, then wet vulcanizing the strip of rubber composition with the strip of paper attached thereto, then permitting the strip of vulcanized rubber composition and the strip of paper to dry and thereafter removing the strip of paper from the strip of rubber composition.

2. The method of producing a strip of undistorted vulcanized permeable hard rubber composition which consists in preparing a preliminary strip of uncured permeable hard rubber composition, passing the preliminary strip of rubber composition and a strip of paper of kraft type in direct contact with the strip of rubber composition through calender rolls whereby the strip of rubber composition and the strip of paper are attached so tightly together as to be substantially relatively unmovable, then wet vulcanizing the strip of rubber composition with the strip of paper attached thereto, then permitting the strip of vulcanized rubber composition and the strip of paper to dry and thereafter removing the strip of paper from the strip of rubber composition.

3. The method of preventing a strip of permeable hard rubber from distorting prior to and during vulcanization which consists in applying directly to one surface of a strip of uncured permeable hard rubber composition before it has had opportunity to distort a strip of unglazed unstretchable paper in such manner that the strip of rubber composition and the strip of paper are relatively unmovable, then wet vulcanizing the strip of hard rubber composition with the strip of paper attached thereto, then permitting the vulcanized rubber composition and the strip of paper to dry and thereafter stripping the paper from the strip of rubber composition.

4. The method of preventing a strip of permeable hard rubber from distorting prior to and during vulcanization which consists in applying directly to one surface of a strip of uncured permeable hard rubber composition before it has had opportunity to distort a strip of paper of kraft type in such manner that the strip of rubber composition and the strip of paper are relatively unmovable, then wet vulcanizing the strip of hard rubber composition with the strip of paper attached thereto, then permitting the vulcanized rubber composition and the strip of paper to dry and thereafter stripping the paper from the strip of rubber composition.

5. The method of producing a strip of undistorted vulcanized permeable hard rubber composition which consists in preparing a preliminary strip of uncured permeable hard rubber composition, passing the preliminary strip of rubber composition through calender rolls, and before the calendered strip of rubber composition has left one of the rolls applying to it a strip of unglazed unstretchable paper in direct contact therewith so as to be substantially relatively unmovable thereto, then wet vulcanizing the strip of rubber composition with the strip of paper attached thereto, then permitting the strip of rubber composition and the strip of paper to dry and thereafter removing the strip of paper from the strip of rubber composition.

6. The method of producing a strip of undistorted vulcanized permeable hard rubber composition which consists in preparing a preliminary strip of uncured permeable hard rubber composition, passing the preliminary strip of rubber composition through calender rolls, and before the calendered strip of rubber composition has left one of the rolls applying to it a strip of paper of kraft type in direct contact therewith so as to be substantially relatively unmovable thereto, then wet vulcanizing the strip of rubber composition with the strip of paper attached thereto, then permitting the strip of rubber composition and the strip of paper to dry and thereafter removing the strip of paper from the strip of rubber composition.

7. The method of treating a strip of calendered uncured permeable hard rubber composition prior to vulcanization which consists in applying directly to one surface of a strip of calendered uncured permeable hard rubber composition before it has had opportunity to distort a strip of substantially unstretchable paper in such manner that the strip of rubber composition and the strip of paper are substantially relatively unmovable, then wet vulcanizing the strip of rubber composition with the strip of paper attached thereto, then permitting the strip of vulcanized rubber composition and the strip of paper to dry and thereafter removing the paper from the strip of vulcanized rubber composition.

HERMAN J. SCHELHAMMER.
DONALD H. COURSEN.